(29.) RICHARD H. CHINN, GEORGE HALL & JESSE J. FITCH.
Improvement in Box Openers.
No. 122,106. Patented Dec. 26, 1871.
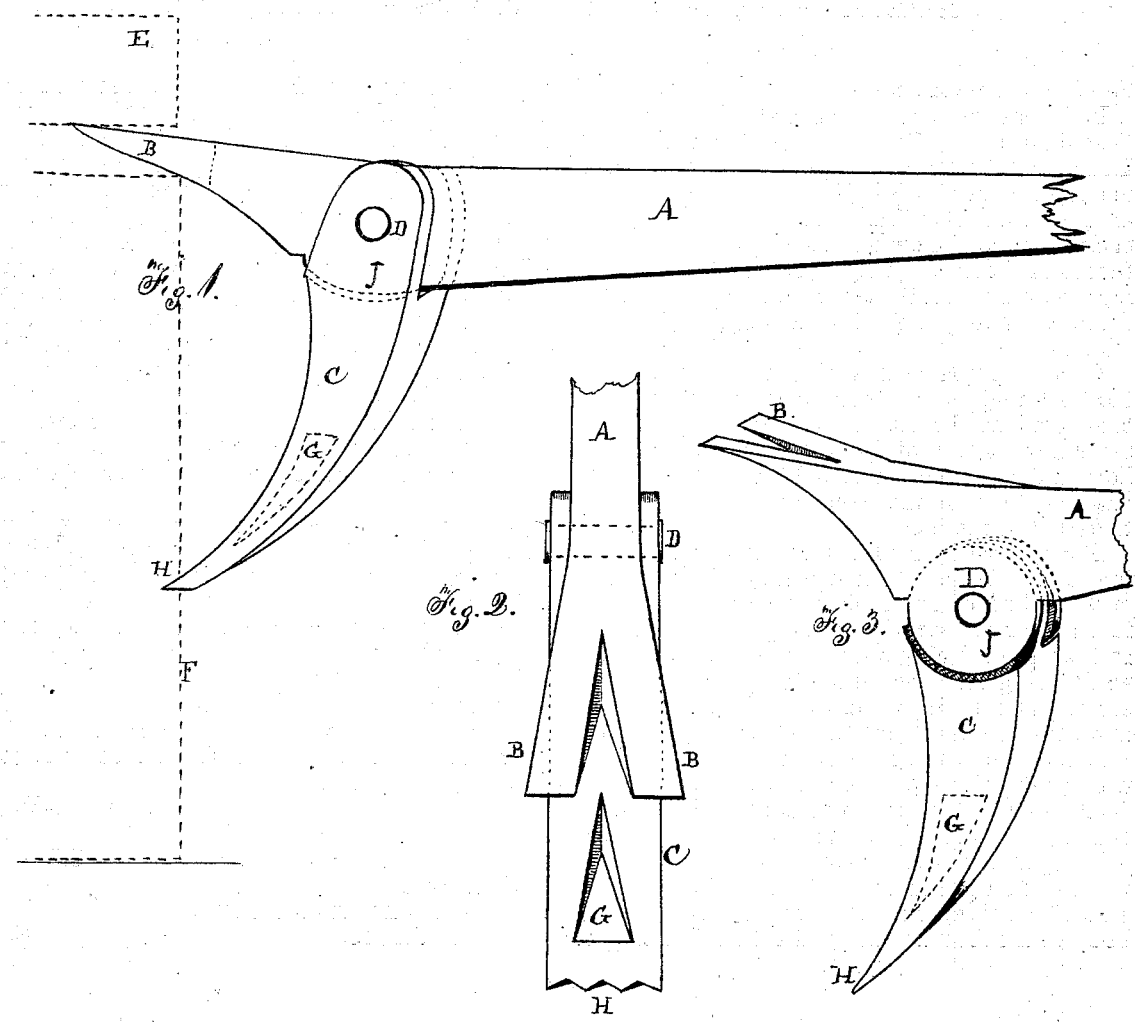

UNITED STATES PATENT OFFICE.

RICHARD H. CHINN, OF WASHINGTON, DISTRICT OF COLUMBIA, GEORGE HALL, AND JESSE J. FITCH, OF MORGANTOWN, WEST VIRGINIA.

IMPROVEMENT IN BOX OPENERS.

Specification forming part of Letters Patent No. 122,106, dated December 26, 1871.

*To all whom it may concern:*

Be it known that we, RICHARD H. CHINN, of Washington city, District of Columbia, GEORGE HALL, and JESSE J. FITCH, of Morgantown, Monongalia county, West Virginia, have invented an Improved Claw-Bar; and we do hereby declare that the following is an exact description thereof, reference being had to the accompanying drawing and to the letters of reference marked thereon making a part of this specification, in which—

Figure 1 represents a side view of the claw-bar with its jointed attachment or improvement connected at the side of the bar. Fig. 2 represents a front view of the same; and Fig. 3 shows how the improvement may be attached to the claw-bar by a circular connection or swivel-joint underneath the bar.

The nature of our invention consists in attaching to the ordinary claw-bar an additional claw or foot, that is adjustable to operate as a rest or fulcrum for the bar while raising the lid of a box, so that the lid may not be damaged or broken while being removed, and the angular aperture serving also to draw out the nails from the box and save the nails that they may be again used.

A represents the claw-bar or lever commonly used for opening boxes and drawing out the nails; B, the claw. C is the additional foot or claw that hangs loosely on the lever by a circular joint, J, and grooved bearing held by a swivel-pin, D, the ends of the foot extending on each side of the lever, and the lever resting upon the body of the foot at the joint J as a bearing, so that when the claw B is inserted between the box and its lid, and the foot C is adjusted with its toothed or pronged end to rest against the side of the box, the lever A is pressed down, and having a purchase or equal bearing on the claw C, the lid E of the box F is raised without breaking the lid or spoiling the box, as shown by the dotted lines E and F. The claw C has an angular aperture, G, for the purpose of placing it over the head of a nail and easily withdrawing the nail without bending or breaking it, and the toothed end or points H of the claw catch firmly against the side of the box F and assists the lever to act more powerfully, while the circular joint J enables the claw to act with an equal purchase upon the nail, drawing it upward without injuring it.

We are aware of G. C. Taft's box-opener, patented October 21, 1851, and of N. Purday's combined claw, hammer, and hatchet, patented October 11, 1870; but these we do not claim; therefore

What we claim as our invention, and desire to secure by Letters Patent, is—

The combination of the jointed claw C, provided with aperture G and toothed point H, with the rule-jointed lever A, when constructed and operated as herein shown and described, and for the purposes specified.

RICHD. H. CHINN.
GEORGE HALL.
JESSE J. FITCH.

Witnesses:
J. FRANKLIN REIGART,
M. HAYES.

(29).